(12) United States Patent
Teglia

(10) Patent No.: US 7,116,783 B2
(45) Date of Patent: Oct. 3, 2006

(54) NON-DETERMINISTIC METHOD FOR SECURED DATA TRANSFER

(75) Inventor: Yannick Teglia, La Bouilladise (FR)

(73) Assignee: STMicroelectronics S.A., Gentilly (FR)

( * ) Notice: Subject to any disclaimer, the term of this patent is extended or adjusted under 35 U.S.C. 154(b) by 796 days.

(21) Appl. No.: 09/738,548

(22) Filed: Dec. 15, 2000

(65) Prior Publication Data
US 2001/0025344 A1    Sep. 27, 2001

(30) Foreign Application Priority Data
Dec. 15, 1999  (FR) ................................ 99 15796

(51) Int. Cl.
*H04K 1/00* (2006.01)
*H04L 9/00* (2006.01)
(52) U.S. Cl. ...................... 380/255; 380/268
(58) Field of Classification Search ................. 380/43, 380/278
See application file for complete search history.

(56) References Cited

U.S. PATENT DOCUMENTS

| | | | |
|---|---|---|---|
| 5,944,833 A | | 8/1999 | Ugon |
| 6,154,823 A | * | 11/2000 | Benayon et al. ............. 711/171 |
| 6,195,752 B1 | * | 2/2001 | Pfab ........................... 713/168 |
| 6,415,032 B1 | * | 7/2002 | Doland ....................... 380/255 |

FOREIGN PATENT DOCUMENTS

EP    0809171 A1    11/1997
EP    0908810 A2    4/1999

OTHER PUBLICATIONS

T. Ritter, "Transposition Cipher with Pseudo-Random Shuffling: The Dynamic Transposition Combiner", 1991, http://www.ciphersbyritter.com/ARTS/DYNTRAN2.HTM, retrieved on Mar. 7, 2005.*
French Preliminary Search Report dated Sep. 20, 2000.

* cited by examiner

*Primary Examiner*—Ayaz Sheikh
*Assistant Examiner*—Brandon Hoffman
(74) *Attorney, Agent, or Firm*—Lisa K. Jorgenson; Stephen Bongini; Fleit, Kain, Gibbons, Gutman, Bongini & Bianco P.L.

(57) ABSTRACT

A method is provided for secured transfer of data from a first memory containing the data element to a second memory through a data bus that is connected between the first memory and the second memory. According to the method, a secret N-byte data element is transferred byte-by-byte through the data bus, with each byte transiting at least once on the data bus. Before each transfer of a byte of the secret data element, a current index ranging from 0 to N−1 is randomly chosen, with the current index corresponding to a place value of the byte to be transferred. At each transfer of a byte of the secret data element with a place value equal to the current index, a corresponding bit of an N-byte loading indicator is modified as a function of a loading mode, with the loading mode being an integer ranging from 0 to a first constant. The transfer of the secret data element is ended when the loading indicator takes a predetermined value.

21 Claims, 1 Drawing Sheet

NON-DETERMINISTIC METHOD FOR SECURED DATA TRANSFER

CROSS-REFERENCE TO RELATED APPLICATIONS

This application is based upon and claims priority from prior French Patent Application No. 99-15796, filed Dec. 15, 1999, the entire disclosure of which is herein incorporated by reference.

BACKGROUND OF THE INVENTION

1. Field of the Invention

The present invention relates to electronic devices, and more specifically to a method for securely transferring data in a programmable circuit.

2. Description of Related Art

In some applications, it is desirable to protect data elements contained in a memory of a programmable circuit from the possibility of being inspected while being transferred to another memory. For example, the secret data elements can be personal data elements that identify the owner of the programmable circuit, program instructions, or keys for data encryption algorithms. The secret data elements are usually stored in read-only memories of the programmable circuit during fabrication. Conventional techniques are used to protect the contents of such read-only memories from a visual inspection. For example, the data elements may be scattered in the memory. However, when the data elements are used, they travel in non-encrypted form on a data bus that can be easily snooped.

In one conventional snooping technique, the current flowing through the bus is measured. This current represents the data that flows through the bus. The snooper makes K measurements of current during K transits of the same data elements, and takes the average of these K measurements to eliminate the noise from the measurement and obtain the exact value of the data element. In general, it is necessary to make about 1000 measurements (K=1000) to remove the noise and obtain the exact value of the data traveling through the bus. This snooping technique is known as "Simple Power Analysis".

Furthermore, in order to reduce the cost of manufacturing products, the secret data elements are often partly the same for a given family of programmable circuits. Thus, if a snooper manages to read the secret data elements stored in one product, they can be used for an entire family of products.

SUMMARY OF THE INVENTION

In view of these drawbacks, it is an object of the present invention to overcome the above-mentioned drawbacks and to improve the security of data in a programmable circuit.

Another object of the present invention is to improve the security of data transiting through a data bus.

Yet another object of the present invention is to provide a programmable circuit in which data can be transferred in a highly secure manner.

One embodiment of the present invention provides a method for secured transfer of data from a first memory containing the data element to a second memory through a data bus that is connected between the first memory and the second memory. According to the method, a secret N-byte data element is transferred byte-by-byte through the data bus, with each byte transiting at least once on the data bus. Before each transfer of a byte of the secret data element, a current index ranging from 0 to N−1 is randomly chosen, with the current index corresponding to a place value of the byte to be transferred. At each transfer of a byte of the secret data element with a place value equal to the current index, a corresponding bit of an N-byte loading indicator is modified as a function of a loading mode, with the loading mode being an integer ranging from 0 to a first constant. The transfer of the secret data element is ended when the loading indicator takes a predetermined value.

Another embodiment of the present invention provides a method for secured transfer of data from a first memory containing the data element to a second memory through a data bus that is connected between the first memory and the second memory, so as to transfer a secret N-byte data element byte-by-byte through the data bus, with each byte transiting at least once on the data bus. According to the method, a current index ranging from 0 to N−1 is randomly chosen, and a loading mode ranging from 0 to a first constant is chosen. The byte of the secret data element that has a place value equal to the current index is loaded in the second memory, and a bit of a loading indicator that has a place value equal to the current index is modified as a function of the loading mode. A first test is performed to compare the value of the loading indicator with a predetermined value. Based on the result of the first test, either the previous steps are repeated or the transfer is ended.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Figure 1:
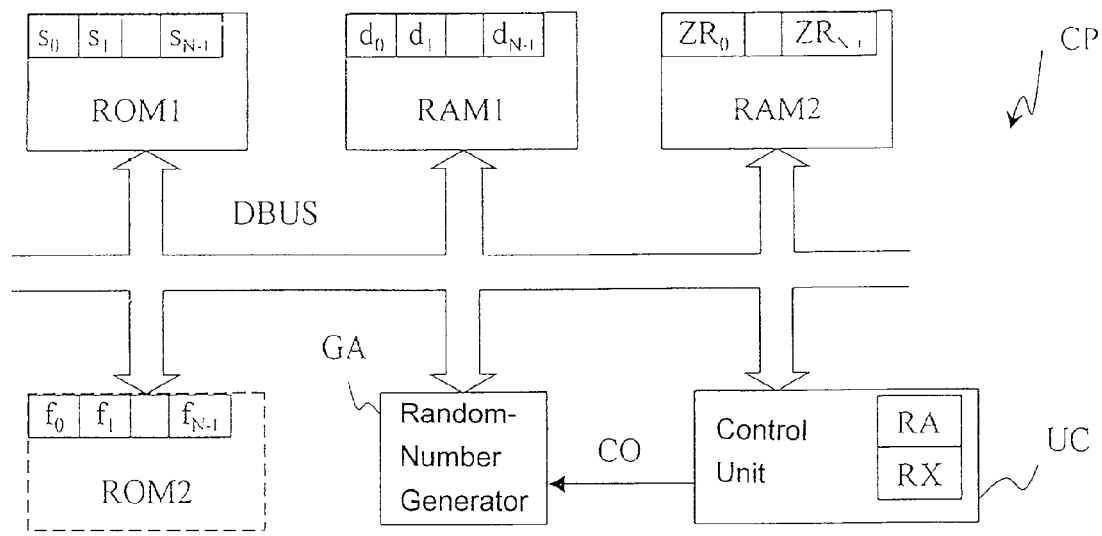
FIG. 1 is a block diagram of a programmable circuit that implements a secure data transfer method according to one embodiment of the present invention.

Preferred embodiments of the present invention will be described in detail hereinbelow with reference to the attached drawings.

Preferred embodiments of the present invention provide methods for securely transferring data in a programmable circuit. In one embodiment, the programmable circuit includes at least one control unit, a read-only memory containing data to be transferred, a writable memory, and a data bus that is connected between the read-only memory and the writable memory. The data bus is controlled by the control unit. During operation of the programmable circuit, a secret N-byte data element transits byte-by-byte through the data bus, with each byte transiting at least once through the data bus. The place value of a byte to be transferred is equal to a current index that is chosen randomly before each transfer of a byte and ranges from 0 to N−1. At each transfer of a byte of the secret data element with a place value equal to the current index, a corresponding (same place-value) bit of an N-byte loading indicator is modified, as a function of a loading mode. The loading mode is an integer number ranging from 0 to a first constant, and the transfer of the secret data element is completed when the loading indicator takes a predetermined value.

Thus, the bytes of the secret data element are transferred through the bus in an order that is randomly chosen by the control unit that controls the data bus, with the place value of each byte to be transferred being chosen randomly before each transfer of a byte and the number of transits of the same byte on the bus being a random value. In order to check that all the bytes of the secret data element have been transferred, a loading indicator is modified when the loading of a byte is accurately done. The transfer of all of the bytes of the secret data element is ended when the loading indicator takes a predefined value.

Thus, at each transfer of the same data element, the order of transfer of the bytes of the data element is different and each byte of the data element is not transferred the same number of times at each transfer of the data element. Therefore, the commonly used snooping methods are no longer enough to obtain the exact value of a secret data element traveling through the data bus. Further, the trace left on the bus by the data element during its transit through the data bus is different and lasts for a variable length period at each transfer of the same data element.

According to one preferred embodiment, the loading mode is chosen randomly by the control unit before each transfer of a byte of the secret data element. The bit of the loading indicator that has the same place value as the current index takes a first value if the loading mode is equal to a second constant, which is less than or equal to the first constant. Otherwise, that bit takes a second value.

In one embodiment, a byte with a place value equal to the current index of the secret data element travels on the data bus if the loading mode is equal to the second constant. If not, a byte with a place value that is equal to the current index of a false data element transits on the data bus, with the false data element being stored in the read-only memory. On the data bus, the bytes of the secret data element are thus mixed with the bytes of a false data element to augment the complexity of the transfer method. The first and second constants may be chosen to be equal or different. Furthermore, the constants may be stored in the read-only memory of the programmable circuit or chosen randomly during an initialization step.

In one illustrative embodiment, the method includes the following steps. First, in step E0, the method is initialized. Next, in step E1, the current index is chosen from the range 0 to N–1. In step E2, the mode of loading is chosen from the ranging 0 to the first constant. Then, in step E3, the byte of the secret data element with a place value equal to the current index is loaded in the random-access memory, and the corresponding (same place-value) bit of the loading indicator is modified as a function of the loading mode. In step E4, a first test is performed to compare the value of the loading indicator with a predetermined value. If the first test is negative, steps E1 to E3 are performed again. On the other hand, if the first test is positive, the transfer ends.

In another embodiment, a programmable circuit is provided that includes at least one control unit, a read-only memory containing data elements to be transferred, a writable memory, and a data bus that is connected between the read-only memory and the writable memory. The data bus is controlled by the control unit. The programmable circuit also has a random number generator for providing the control unit with at least one random number that is used to implement a secured data transfer method.

Throughout this description, the expression "place value of a byte" refers to the rank or number of a byte of the secret data element. In other words, for a secret data element having N bytes with each byte being identified by a place value ranging from 0 to N–1, the byte with the "place value" 0 corresponds to the eight least significant bits and the byte with the "place value" N–1 corresponds to the eight most significant bits of the secret data element.

FIG. 1 shows an exemplary programmable circuit for implementing a secure data transfer method according to one embodiment of the present invention. As shown, the programmable circuit CP includes a read-only memory ROM that contains an N-byte secret data element stored at addresses $s_0$ to $s_{N-1}$, first and second random-access memories RAM1 ans RAM2, a control unit UC, a random number generator GA, and a data bus DBUS that connects the other elements to one another.

The random-access memories RAM1 and RAM2 are writable or rewritable memories (for example, of the EPROM or EEPROM type). The random number generator GA is a conventional circuit which, in response to an instruction CO from the control unit UC, gives random whole numbers ranging from 0 to an integer MAX (for example, to 255). The control unit UC receives instructions contained in the read-only memory ROM, and controls the random-access memories RAM1 and RAM2 and the random number generator GA. The control unit UC includes two registers RA and RX.

The programmable circuit CP also has other conventional elements such as data and instruction registers, arithmetic and logic computation circuits, counters, clock circuits, and input and/or output ports. The programmable circuit can also include several random-access memories, several read-only memories, and/or several random number generators. Furthermore, each element of the programmable circuit CP may communicate with one or more other elements through control buses, data buses, and/or address buses. However, for simplification, only the elements of the programmable circuit CP that relate to the understanding of the present invention are shown in FIG. 1.

An example will now be given to explain the operation of the programmable circuit. In this example, the secret data element $Oct_0$ to $Oct_{N-1}$ is stored at addresses $s_0$ to $s_{N-1}$ of the read-only memory ROM1 of the programmable circuit CP and must be transferred from the read-only memory ROM1 to the first random-access memory RAM1 at addresses $d_0$ to $d_{N-1}$ to be used at a later time. For simplicity, N is chosen to be equal to 4.

The secret data element is transferred byte by byte, and the N bytes are not transferred in the same order at each transfer of the secret data element. Further, each byte of the secret data element is transferred one or more times during the same transfer of data. To achieve this, this embodiment of the present invention uses a transfer rule having one or more parameters that are chosen randomly by the control unit UC, either before each transit of the secret data element on the data bus or before each transit of a byte of the secret data element.

Figure 2:
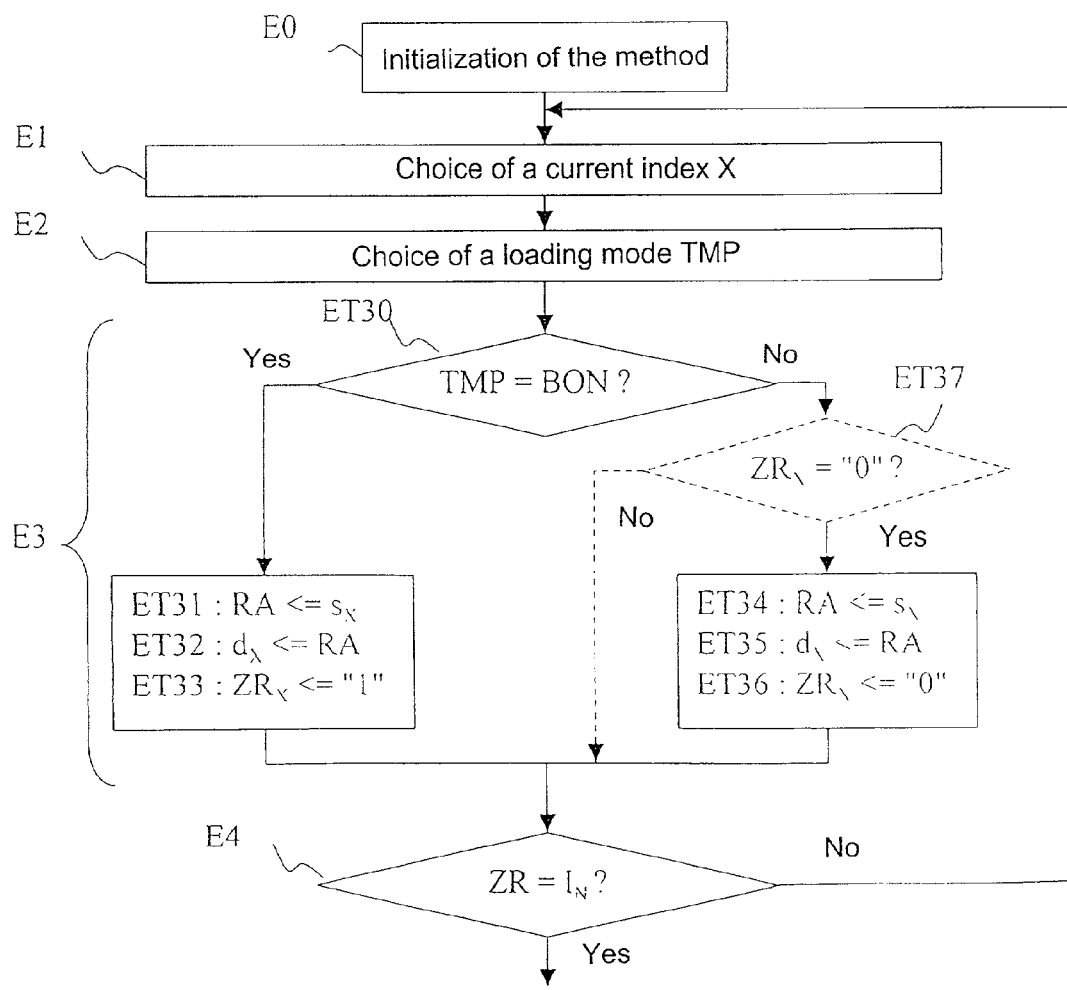
FIG. 2 is a flow chart of a secure data transfer method according to an embodiment of the present invention.

In one illustrative embodiment, the following steps are performed, as shown in FIG. 2. First, in step E0, the process is initialized. In particular, in a first sub-step, all of the bits of an N-bit loading indicator ZR stored in random-access memory RAM2 are set. In a second sub-step, a first constant NBCH is read from the read-only memory ROM1 and stored in register RX of the control unit UC. Next, in a third sub-step, a second constant BON is read from the read-only memory ROM1 and stored in register RX of the control unit UC.

Then, a current index X is chosen from the range 0 to N−1 in step E1, and a loading mode TMP from the range 0 to the value of the first constant NBCH in step E2. In step E3, the byte of the secret data element having a place value equal to the current index X is loaded in random-access memory RAM1, and bit $ZR_X$ (with the same place value X) of the loading indicator ZR is modified as a function of the loading mode TMP. Next, in step E4, a first test is performed to compare the value of the loading indicator ZR with a predetermined value $I_N$, which is an N bit word for which all the bits are equal to "1". If the first test is negative ($ZR \neq I_N$), new steps E1 to E3 are performed. Otherwise, if the first test is positive ($ZR = I_N$), the transfer ends.

Step E3 of the transfer method of FIG. 2 can be divided into the following sub-steps. In step E3, a second test is performed at sub-step ET30 to compare the value of the loading mode TMP with the value of the second constant BON. If the second test is positive (TMP=BON), sub-steps ET31 to ET33 are performed. In particular, in sub-step ET31, the byte $Oct_X$ (with a place value X) of the data element to be transferred is read from address $s_X$ of the read-only memory ROM1, and the this byte is stored in register RA of the control unit UC. Then, in sub-step ET32, the byte contained in register RA is written at address $d_X$ of random-access memory RAM1. In sub-step ET33, the bit $ZR_X$ (with the place value X) of the loading indicator ZR is set at "1".

On the other hand, if the second test is negative (TMP≠BON), sub-steps ET34 to ET36 are performed. In this embodiment, sub-step ET34 is identical to sub-step ET31 (i.e., the byte $Oct_X$ with a place value X of the data element to be transferred is read from address $s_X$ of the read-only memory ROM1). Further, in this embodiment, sub-step ET35 is identical to sub-step ET32 (i.e., the byte is stored in register RA of the control unit UC and then the byte contained in register RA is written at address $d_X$ of random-access memory RAM1). Next, in sub-step ET36, the bit $ZR_X$ (with a place value X) of the loading indicator ZR is set at "0".

In this illustrative embodiment, the constants NBCH and BON are two data elements stored in the read-only memory ROM1 such that BON is less than or equal to NBCH. The choice of the constant NBCH is generally a compromise between a maximum degree of security and a mean time of loading an acceptable data element. Indeed, the security of the transfer method as well as the mean time for loading a data element in the random-access memory RAM1 increases when the value of constant NBCH increases. For this example, NBCH is chosen to be equal to 3. The other constant BON takes any value between 0 and NBCH, and the value of BON has no influence on the security of the method or the mean transfer time of a data element.

The transfer rule of the transfer method defines the order in which the bytes of the data element are transferred from the read-only memory ROM1 to the random-access memory RAM1, as well as the number of transfers of the same byte of the data element during the transfer of the complete data element. In other words, the transfer rule defines the variations of the current index X during the transfer of the secret data element. In preferred embodiments, the transfer rule has two parameters. The first parameter X (also called a current index) ranges from 0 to N−1 and defines the place value of the byte to be transferred during the performance of step E3.

The second parameter TMP ranges from 0 to the value NBCH and indicates whether or not the loading of the byte $Oct_X$ with a place value X during step E3 has to be taken into account. If the second parameter TMP is equal to constant BON (test at ET30), then the transfer of the byte $Oct_X$ is taken into account (i.e., it is assumed that the byte $Oct_X$ has been effectively transferred). The loading indicator ZR is modified accordingly (i.e., the bit $ZR_X$ with a place value X of the loading indicator takes the logic value "1" during sub-step ET33). Conversely, if the second parameter TMP has a value ranging from 0 to NBCH but different from constant BON, then the transfer of the byte $Oct_X$ of the secret data element is not taken into account (i.e., it is considered that the byte has not really been transferred). The loading indicator ZR is again modified accordingly (the bit $ZR_X$ with a place value X of ZR takes the logic value "0" during sub-step ET36).

According to one embodiment of the present invention, the parameters X and TMP are chosen randomly during the performance of steps E1 and E2 of the transfer method as follows. During the performance of step E1, the generator GA gives a first random number to the control unit UC when a first control signal $CO_1$ is received. If the first random number is greater than N, the control unit reduces it modulo N to obtain a current index X ranging from 0 to N−1, and X is then stored in register RS. Then, during the performance of step E2, the generator GA gives a second random number to the control unit UC when a second control signal $CO_2$ is received. If the second random number is greater than NBCH, the control unit reduces it modulo (NBCH+1) in order to obtain a loading mode TMP ranging from 0 to NBCH, and TMP is then stored in register RX of the control unit UC.

The loading indicator ZR is a binary number of N bits stored in random-access memory RAM2 and is used to control the progress of the loading of the data element in the random-access memory. In particular, the loading indicator ZR indicates whether or not the transfer of a byte of the secret data element into random-access memory RAM1 has been taken into account and if the transfer of all of the bytes of the secret data element has been taken into account. For example, if the bit $ZR_X$ with a place value X of the variable ZR is equal to "1", then the loading of the byte $Oct_X$ of the secret data element in random-access memory RAM1 has been taken into account. Conversely, if the bit $ZR_X$ with a place value X of ZR is equal to "0", then the loading of the byte $Oct_X$ of the secret data element has not been taken into account.

The loading indicator ZR is modified at each performance of step E3, and more particularly during the performance of sub-step ET33 or sub-step ET36. During the performance of step E4, it is ascertained whether all of the bits of the variable ZR are equal to "1" (i.e., whether the transfer of all of the bytes of the secret data element has been taken into account).

The loading indicator is initialized during step E0. In this example, all of the bits of ZR are set to "0". The indicator is then modified or not modified during the transfer as a function of the parameter X, which varies between 0 and N−1, and as a function of the parameter TMP, which varies between 0 and NBCH. There are (N*(NBCH+1))! different ways of transferring the same N-byte data element to the random-access memory. Furthermore, the mean time of transfer of all of the bytes of the secret data element is equal to N*(NBCH+1)*TPS, where TPS is the time taken to transfer a byte from the random-access memory RAM1 to the read-only memory ROM1.

In accordance with the specific application, various modifications can be made to the transfer method of FIG. 2 to produce further advantageous embodiments of the present invention. For example, in one exemplary embodiment, at the same time as the bytes of the secret data element are transferred, the bytes of a false data element are transferred. For this purpose, there is stored a false data element at addresses $f_0$ to $f_{N-1}$ of a second read-only memory ROM2 (shown in dashes in FIG. 1). Further, sub-steps ET34 and ET35 of the transfer method are replaced by the following sub-steps ET34' and ET35'. In sub-step ET34', the byte $Oct_X$ with a place value X of the false data element is read from address $f_X$ of the second read-only memory ROM2 and stored in register RA of the control unit UC. Then, in sub-step ET35', the byte contained in register RA is written at address $d_X$ of random-access memory RAM1.

Thus, during their transit on the data bus DBUS, the bytes of the secret data element are mixed with bytes of a false data element. During step E3 of the transfer method, if the loading mode TMP is equal to BON, the byte $Oct_X$ with a place value X of the secret data element transits on the bus DBUS (sub-steps ET31 and ET32) and the bit $ZR_X$ with a place value X corresponding to the indicator ZR takes the value "1" (sub-step ET33). Conversely, if TMP is different from BON, the byte with the place value X of the false data element transits on the bus DBUS (sub-steps ET34' and ET35') and the bit with the place value X corresponding to the indicator ZR takes the value "0" (sub-step ET36).

This makes it even more difficult to snoop on the data bus DBUS because it is not possible to predict whether a byte that transits on the bus is a byte of the secret data element or a byte of the false data element. For this embodiment to be most effective, it is necessary to choose memories ROM1 and ROM2 to be of the same type (for example, both of the read-only memory type or both of the writable or rewritable memory type).

The false data element is an unspecified data element, which may be variable. For example, the false data elements may be chosen randomly during the process initialization step E0. The false data element may also be located in a stack zone of the programmable circuit that is permanently modified as a function of the activities of the control unit UC. However, it is preferable to choose a false data element having the same Hamming weight as the secret data element (i.e., a false data element of which all the bytes have the same number of bits at "1"(or at "0") as the corresponding bytes of the secret data element).

Additional modifications can be made to the transfer method of FIG. 2 to produce further embodiments of the present invention. For example, in one advantageous embodiment, a step ET37 or ET37' (as shown in dashes in FIG. 2) is performed whenever the test of step ET30 is negative (TMP≠BON). In step ET37, the value of the bit $ZR_X$ (with a place value X) of the indicator ZR is tested. If $ZR_X$="0", steps ET31, ET32, and ET36 are performed. On the other hand, if $ZR_X$="1", step E3 is ended, as shown in FIG. 2.

Similarly, in step ET37', the value of the bit $ZR_X$ (with a place value X) of the indicator ZR is tested. If $ZR_X$="0", steps ET34 through ET36 are performed. If $ZR_X$="1", step E3 is ended. Step ET37 is performed in the case where only bytes of the secret data element are to be transferred travel on the bus, and step ET37' is performed in the case where bytes of the secret data and bytes of the false data element travel on the bus. This embodiment limits the mean transfer time of a data element by avoiding the unnecessary loading of a byte $Oct_X$ when it has already been taken into account in a previous step E3.

Other modifications may be made to the transfer method of FIG. 2. For example, in step E0 for the initialization of the process, the constants NBCH and BON are read from memory ROM1, and then stored in register RX. However, in further embodiments, the numbers NBCH and BON are chosen as variables (for example, as given by the random-number generator GA during step E0). However, BON must be chosen to be lower than NBCH. Furthermore, it is possible to choose identical constants NBCH and BON, so as to enable a reduction of the time for executing step E0.

It is also possible to choose a constant parameter TMP that is equal to the constant BON. In such embodiments, test ET30 will be always positive and only steps ET31 to ET33 will be executed. This modification has the advantage of reducing the mean data transfer time because each byte is transferred only once. However, it also limits the number of different ways of loading the same data element. In particular, if the parameter TMP is kept constant, there are only N! different ways of loading the secret data element, which limits the overall effectiveness of the transfer method.

Additionally, in step E4, it is possible to choose a pre-defined value IN that is a binary number for which the N bits are identically zero. In such an embodiment, care is taken during the first sub-step of step E0 to first initialize all the bits of the loading indicator ZR at "1" (and not at "0" as in the previous embodiments) and to replace step E3 by the following step E3'. In step E3', the second test ET3O is performed to compare the value of the loading mode TMP with the value of the constant BON. If the second test is positive (TMP=BON), steps ET31, ET32, and ET36 are performed. Conversely, if the second test is negative (TMP≠BON), steps ET34, ET35, and ET33 are performed.

Furthermore, modifications can be made to the programmable circuit CP without modifying its overall operation. In the exemplary circuit of FIG. 1, the programmable circuit CP includes two random-access memories RAM1 and RAM2. In further embodiments, these memories can be replaced by a single random-access memory having two distinct zones in which there are stored the bytes of the secret data element transferred to addresses $d_0$ to $d_{N-1}$ and the N bits $ZR_0$ to $ZR_{N-1}$ of the loading indicator ZR, respectively. The bits of the secret data element and those of the loading indicator could also be scattered throughout the read-only memories ROM1 and ROM2 or throughout a single read-only memory. In the same way, the two read-only memories ROM1 and ROM2 can be replaced by a single read-only memory in which there is stored the N bytes of the secret data element and (if required) the N bytes of the false data element.

One advantage of the present invention is that it is not possible to foresee the duration of transfer of a secret data element from the read-only memory ROM1 to the random-access memory. In particular, since the parameters X and TMP are chosen randomly at each transfer of a byte, it is not possible to predict the time when all the bytes of the secret data element will be transferred. This type of method is known as "non-deterministic." Similarly, it is not possible to predict the order of transfer of the bytes of the secret data element since this order is chosen randomly and is not the same for each transfer of the same data element.

Therefore, the simple power analysis method of snooping is inoperative with a method of this kind. More specifically, if K current measurements are performed during K transfers of the same data element on the bus DBUS, and if an average of these K measurements is taken to eliminate the noise from the result of the measurement, the mean result obtained will give no information on the secret data element transferred since neither the number of bytes nor the order of the bytes of the data element can be predicted.

Another advantage of the present invention is that it provides a data transfer method that can be used in parallel with other data-protection methods without disturbing the working of these other methods. For example, in the embodiments described above, it has been assumed that the addresses $s_0$ to $s_{N-1}$ and $d_0$ to $d_{N-1}$ are consecutive in memories ROM1 and RAM1. However, it is quite possible to transfer data whose bytes are scattered throughout one or both of the memories.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the appended claims.

What is claimed is:

1. A method for secured transfer of an N-byte secret data element from a first memory containing the secret data element to a second memory through a data bus that is connected between the first memory and the second memory, said method comprising the steps of:
   transferring the N-byte secret data element byte-by-byte from the first memory to the second memory through the data bus with the bytes of the N-byte secret data element being transferred through the data bus in an order that is randomly chosen and each byte transiting at least once through the data bus,
   wherein the transferring step includes the sub-steps of:
      before each transfer of one of the bytes of the N-byte secret data element, randomly choosing a current index ranging from 0 to N−1, the current index corresponding to a place value of the byte of the N-byte secret data element to be transferred,
      at each transfer of one of the bytes of the N-byte secret data element, transferring the byte of the N-byte secret data element with a place value equal to the current index and modifying a corresponding bit of a loading indicator as a function of a loading mode, the loading mode being an integer ranging from 0 to a first constant; and
      ending the transfer of the N-byte secret data element when the loading indicator takes a predetermined value.

2. The method as defined in claim 1,
   wherein the transferring step further includes the sub-step of randomly choosing the loading mode before each transfer of one of the bytes of the N-byte secret data element, and
   the first constant is greater than or equal to one.

3. The method as defined in claim 1,
   wherein in the transferring sub-step, the bit of the loading indicator with a place value equal to the current index takes a first value if the loading mode is equal to a second constant and, if not, takes a second value,
   the first constant is greater than or equal to one, and
   the second constant is less than or equal to the first constant.

4. The method as defined in claim 3, further comprising the step of randomly choosing the first and second constants during initialization.

5. The method as defined in claim 3, further comprising the step of reading the first and second constants from one of the memories.

6. The method as defined in claim 3, wherein the first and second constants are equal.

7. The method as defined in claim 1, wherein the transferring sub-step includes:
   determining if the loading mode is equal to a second constant, the first constant being greater than or equal to one;
   transferring the byte of the secret data element with a place value equal to the current index if the loading mode is equal to the second constant; and
   transferring a byte of a false data element with a place value equal to the current index if the loading mode is not equal to the second constant, the false data element being an N-byte data element that is different than the secret data element.

8. The method as defined in claim 7, further comprising the step of randomly choosing the first and second constants during initialization.

9. The method as defined in claim 7, further comprising the step of reading the first and second constants from one of the memories.

10. The method as defined in claim 7, wherein the first and second constants are equal.

11. A method for secured transfer of an N-byte secret data element from a first memory containing the secret data element to a second memory through a data bus that is connected between the first memory and the second memory, so as to transfer the N-byte secret data element byte-by-byte through the data bus in a byte order that is randomly chosen, with each byte transiting at least once through the data bus, said method comprising the steps of:
   randomly choosing a current index ranging from 0 to N−1;
   choosing a loading mode ranging from 0 to a first constant;
   transferring the byte of the N-byte secret data element that has a place value equal to the current index from the first memory to the second memory, and modifying a bit of a loading indicator that has a place value equal to the current index as a function of the loading mode;
   performing a first test to compare the value of the loading indicator with a predetermined value; and
   based on the result of the first test, either repeating the previous steps or ending the transfer.

12. The method as defined in claim 11, wherein the transferring step includes the sub-steps of:
   performing a second test to compare the value of the loading mode with a second constant, the first constant being greater than or equal to one;
   if the second test is positive, performing the following steps:
      reading the byte of the secret data element with a place value equal to the current index from the first memory, and storing the byte in a register;
      writing the byte in the register to the second memory; and setting at "1" the bit of the loading indicator with a place value equal to the current index; and if the second test is negative, performing the following steps:

reading the byte of the secret data element with a place value equal to the current index from the first memory, and storing the byte in a register;

writing the byte in the register to the second memory; and setting at "0" the bit of the loading indicator with a place value equal to the current index.

13. The method as defined in claim 11, wherein the transferring step includes the sub-steps of:

performing a second test to compare the value of the loading mode with a second constant;

if the second test is positive, performing the following steps:

reading the byte of the secret data element with a place value equal to the current index from the first memory, and storing the byte in a register;

writing the byte in the register to the second memory; and setting at "1" the bit of the loading indicator with a place value equal to the current index; and if the second test is negative, performing the following steps:

testing the bit of the loading indicator with a place value equal to the current index;

if the bit is equal to a predetermined value, performing the following steps:

reading the byte of the secret data element with a place value equal to the current index from the first memory, and storing the byte in a register;

writing the byte in the register to the second memory; and setting at "0" the bit of the loading indicator with a place value equal to the current index; and if the bit is not equal to the predetermined value, ending the transferring step.

14. The method as defined in claim 11, wherein the transferring step includes the sub-steps of:

performing a second test to compare the value of the loading mode with a second constant;

if the second test is positive, performing the following steps:

reading the byte of the secret data element with a place value equal to the current index from the first memory, and storing the byte in a register;

writing the byte in the register to the second memory; and setting at "1" the bit of the loading indicator with a place value equal to the current index; and if the second test is negative, performing the following steps:

reading a byte of a false data element with a place value equal to the current index from the first memory, and storing the byte in a register, the false data element being an N-byte data element that is different than the secret data element;

writing the byte in the register to the second memory; and setting at "0" the bit of the loading indicator with a place value equal to the current index.

15. The method as defined in claim 11, wherein the transferring step includes the sub-steps of:

performing a second test to compare the value of the loading mode with a second constant;

if the second test is positive, performing the following steps:

reading the byte of the secret data element with a place value equal to the current index from the first memory, and storing the byte in a register;

writing the byte in the register to the second memory; and setting at "1" the bit of the loading indicator with a place value equal to the current index; and if the second test is negative, performing the following steps:

testing the bit of the loading indicator with a place value equal to the current index;

if the bit is equal to a predetermined value, performing the following steps:

reading a byte of a false data element with a place value equal to the current index from the first memory, and storing the byte in a register;

writing the byte in the register to the second memory; and setting at "0" the bit of the loading indicator with a place value equal to the current index; and if the bit is not equal to the predetermined value, ending the transferring step.

16. A programmable circuit comprising:

a data bus;

a read-only memory containing an N-byte data secret element to be transferred, the read-only memory being coupled to the data bus;

a writable memory coupled to the data bus;

at least one control unit coupled to the read-only memory and the writable memory; and a random number generator coupled to the control unit, the random number generator supplying at least one random number to the control unit during a transfer of the N-byte secret data element, wherein the control unit controls the programmable circuit such that the N-byte secret data element transits byte-by-byte through the data bus with the bytes of the N-byte secret data element transiting through the data bus in an order that is randomly chosen and each byte transiting at least once through the data bus, before each transfer of one of the bytes of the N-byte secret data element, the control unit randomly chooses a current index ranging from 0 to N−1, the current index corresponding to a place value of the byte of the N-byte secret data element to be transferred, at each transfer of one of the bytes of the N-byte secret data element, the control unit transfers the byte of the N-byte secret data element with a place value equal to the current index from the read-only memory to the writable memory and modifies a corresponding bit of a loading indicator as a function of a loading mode, the loading mode being an integer ranging from 0 to a first constant, and the control unit either repeats the previous steps or ends the transfer of the N-byte secret data element when the loading indicator takes a predetermined value.

17. The programmable circuit as defined in claim 16, wherein the control circuit randomly chooses the loading mode before each transfer of one of the bytes of the N-byte secret data element, and the first constant is greater than or equal to one.

18. The programmable circuit as defined in claim 16,
wherein the control unit transfers the byte of the secret data element with a place value equal to the current index if the loading mode is equal to a second constant, and the control unit transfers a byte of a false data element with a place value equal to the current index if the loading mode is not equal to the second constant, the false data element being an N-byte data element that is different than the secret data element.

19. The method as defined in claim 1,
wherein in the step of transferring the N-byte secret data element, the N-byte secret data element is transferred from the first memory through the data bus to the second memory, and in the sub-step of transferring the byte of the N-byte secret data element, at each transfer of one of the bytes of the N-byte secret data element, the byte of the N-byte secret data element with a place value equal to the current index is transferred from the first memory to the second memory so as to have the same place value in the second memory.

20. The method as defined in claim 1,
wherein the loading indicator includes at least N bits,
the predetermined value of the loading indicator is all N bits of the loading indicator having a first value, and in the sub-step of transferring the byte of the N-byte secret data element, the corresponding bit of the loading indicator that is modified at the transfer of the one byte of the N-byte secret data element is the bit of the loading indicator that has a place value equal to the current index.

21. The method as defined in claim 1, wherein in the transferring step, at least one of the bytes of the secret data element transits at least twice through the data bus from the first memory to the second memory.

\* \* \* \* \*